United States Patent
Müller et al.

(10) Patent No.: US 9,255,032 B2
(45) Date of Patent: Feb. 9, 2016

(54) SETTING ACCELERATOR FOR BINDERS BASED ON CALCIUM SULFATE

(71) Applicant: SIKA TECHNOLOGY AG, Baar (CH)

(72) Inventors: Markus Müller, Zufikon (CH); Thomas Müller, Heidelberg (DE)

(73) Assignee: SIKA TECHNOLOGY AG, Baar (CH)

( * ) Notice: Subject to any disclaimer, the term of this patent is extended or adjusted under 35 U.S.C. 154(b) by 0 days.

(21) Appl. No.: 14/308,207

(22) Filed: Jun. 18, 2014

(65) Prior Publication Data

US 2014/0303289 A1 Oct. 9, 2014

Related U.S. Application Data

(63) Continuation of application No. PCT/EP2012/075305, filed on Dec. 12, 2012.

(30) Foreign Application Priority Data

Dec. 19, 2011 (EP) .................................... 11194294

(51) Int. Cl.
*C04B 24/26* (2006.01)
*C04B 28/14* (2006.01)
*C04B 28/16* (2006.01)
*C04B 40/00* (2006.01)
C04B 103/12 (2006.01)
C04B 111/00 (2006.01)

(52) U.S. Cl.
CPC ........... *C04B 24/2641* (2013.01); *C04B 28/145* (2013.01); *C04B 28/16* (2013.01); *C04B 40/0042* (2013.01); *C04B 2103/12* (2013.01); *C04B 2111/0062* (2013.01)

(58) Field of Classification Search
CPC .. C04B 24/2641; C04B 28/145; C04B 28/16; C04B 40/0042
USPC ........................................................... 524/5
See application file for complete search history.

(56) References Cited

U.S. PATENT DOCUMENTS

| 4,169,747 | A | 10/1979 | De Rooy et al. |
|---|---|---|---|
| 4,298,394 | A | 11/1981 | Leeming et al. |
| 2006/0272554 | A1* | 12/2006 | Jardine et al. ................. 106/823 |
| 2006/0278127 | A1 | 12/2006 | Liu et al. |
| 2008/0009566 | A1 | 1/2008 | Blackburn et al. |
| 2009/0127360 | A1 | 5/2009 | Tracy et al. |
| 2010/0011994 | A1 | 1/2010 | Blackburn et al. |

FOREIGN PATENT DOCUMENTS

| CN | 201006859 Y | 1/2008 | |
|---|---|---|---|
| CN | 101203466 A | 6/2008 | |
| CN | 101868430 A | 10/2010 | |
| EP | 1 061 089 A1 | 12/2000 | |
| EP | 1 138 697 A1 | 10/2001 | |
| JP | 10-279341 A | 10/1998 | |
| WO | WO 2006/115496 A1 | 11/2006 | |
| WO | WO 2006/138289 A2 | 12/2006 | |
| WO | WO 2010/085425 | * 7/2010 | ............... C08K 5/09 |

OTHER PUBLICATIONS

Notification of Transmittal of Translation of the International Preliminary Report on Patentability (PCT/IB/338 and PCT/IB/373) and the Written Opinion of the International Searching Authority (Form PCT/ISA/237) issued on Jun. 24, 2014, by the International Bureau of WIPO in corresponding International Application No. PCT/EP2012/075305. (8 pages).
International Search Report (PCT/ISA/210) mailed on May 22, 2013, by the European Patent Office as the International Searching Authority for International Application No. PCT/EP2012/075305.
Written Opinion (PCT/ISA/237) mailed on May 22, 2013, by the European Patent Office as the International Searching Authority for International Application No. PCT/EP2012/075305.
Chinese Office Action issued in corresponding Chinese Patent Application No. 201280058150.7 dated Aug. 25, 2015.

* cited by examiner

*Primary Examiner* — John Uselding
(74) *Attorney, Agent, or Firm* — Buchanan Ingersoll & Rooney PC

(57) ABSTRACT

A method for making a setting accelerator, especially for binders based on calcium sulfate, wherein gypsum together with at least one polycarboxylate is subjected to a dry grinding.

14 Claims, No Drawings

SETTING ACCELERATOR FOR BINDERS BASED ON CALCIUM SULFATE

RELATED APPLICATION(S)

This application claims priority as a continuation application under 35 U.S.C. §120 to PCT/EP2012/075305, which was filed as an International Application on Dec. 12, 2012 designating the U.S., and which claims priority to European Application No. 11194294.2 filed in Europe on Dec. 19, 2011. The entire contents of these applications are hereby incorporated by reference in their entireties.

FIELD

The disclosure relates to a method for producing a setting accelerator, for example, for binders based on calcium sulfate. Moreover, the disclosure relates to a setting accelerator so produced, as well as a use of the setting accelerator. Further subject matter of the disclosure is a binder composition comprising the setting accelerator and a shaped body containing a hardened binder composition.

BACKGROUND INFORMATION

In the processing of binders based on calcium sulfate, setting accelerating additives or setting accelerators are often used. In this way, the setting times of the binders can be greatly reduced, which is of decisive advantage, for example, in the major industrial production of plasterboard.

An effective setting accelerator for binders based on calcium sulfate is finely ground gypsum or calcium sulfate dihydrate ($CaSO_4.2\ H_2O$). Gypsum acts here for example as a seed crystal, which accelerates the hydration of the calcium sulfate hemihydrate and/or anhydrite present in the binder.

During the production of such setting accelerators, additives are often added to the gypsum during the production, such as starch, sugar or dextrin. These additives serve, for example, to promote the grinding process of the gypsum or to influence the properties of the gypsum after the grinding. For example, additives facilitate the fragmentation of the gypsum in the grinding mills and prevent an agglomeration of the resulting fine particles. Other additives instead increase the setting accelerating action or stability of the gypsum after the grinding.

U.S. Pat. No. 4,298,394 describes in this context, for example, the use of up to 20 wt. % of a surfactant substance as an additive during the grinding of gypsum. Specifically mentioned are, e.g., sodium alkylate sulfonate, sodium lauryl sulfate or ethoxylated nonyl phenol. The use of these additives provides, for example, an improved storage stability and increased setting acceleration.

But many additives and production methods for setting accelerators based on gypsum are not entirely effective. Often they improve only the grinding process or the gypsum properties, for example, the setting accelerating action. Thus, an improvement in the area of the grinding process works to the disadvantage of the setting accelerating action and vice versa. Other methods and additives have economic drawbacks or are expensive in technical implementation.

SUMMARY

According to an exemplary aspect, disclosed is a method for making a setting accelerator suitable for binders based on calcium sulfate, the method comprising subjecting gypsum together with at least one polycarboxylate to a dry grinding.

According to an exemplary aspect, disclosed is a setting accelerator suitable for binders based on calcium sulfate, obtained by the method according to an exemplary aspect.

According to an exemplary aspect, disclosed is a method for accelerating the setting of a binder based on calcium sulfate, the method comprising: adding the setting accelerator according to an exemplary aspect to a binder based on calcium sulfate.

According to an exemplary aspect, disclosed is a binder composition, comprising: a binder based on calcium sulfate, and the setting accelerator according to an exemplary aspect.

According to an exemplary aspect, disclosed is a shaped body, comprising the binder composition according to an exemplary aspect, wherein the binder composition is hardened.

DETAILED DESCRIPTION

For example, disclosed herein are new and alternative solutions which ameliorate or prevent the aforementioned drawbacks of comparative additives and production methods for setting accelerators.

Provided is a method which enables the production of a setting accelerator for binders based on calcium sulfate. For example, the method can be as efficient and/or economical as possible and enables the production of an effective setting accelerator. Furthermore, a setting accelerator can be created which can be produced efficiently and/or economically and which has a comparable or improved action as compared to comparative setting accelerators. Moreover, the setting accelerator can avoid significantly affecting, for example, the workability of binders based on calcium sulfate.

In an exemplary method of the disclosure, gypsum together with a polycarboxylate is subjected to a dry grinding in order to make a setting accelerator, for example, for binders based on calcium sulfate.

In an exemplary aspect, a setting accelerator is provided.

As has been shown in grinding experiments, significantly less caking or sticking to the grinding bodies occurs when using polycarboxylates as additive during dry grinding of gypsum, as compared to a blank sample without additive. Thus, the production capacity of the mill or the amount of gypsum ground per unit of time can be significantly increased for the same mill performance. As a result, the expense for the cleaning of the mill can be reduced, which in turn decreases the wear and tear on the mill or the grinding bodies. Furthermore, the possibility exists of achieving a greater fineness of the ground product when using polycarboxylates. The polycarboxylates used as additives in the method are furthermore available at low cost around the world and are effective already in small amounts in the present composition. For example, a novel, efficient and economical method results for the production of a setting accelerator for binders based on calcium sulfate.

The setting accelerators so produced have, for example, a very good acceleration action in binders based on calcium sulfate. In other words, both the time until the start of setting and the time until the end of setting can be significantly shortened with the setting accelerators according to an exemplary aspect.

The setting accelerators according to the disclosure can have little or no adverse effect on the flowing ability of the binders based on calcium sulfate. This is shown, for example, by the fact that the flowing ability or the degree of spreading diminishes only slightly as compared to a blank sample without the setting accelerator, this decrease being a secondary phenomenon of the setting accelerating action. Thus, the workability of the binders remains the same.

A first aspect of the present disclosure relates to a method for production of a setting accelerator, for example, for binders based on calcium sulfate, wherein gypsum together with at least one polycarboxylate is subjected to a dry grinding.

The term "setting" refers to the solidification of a binder that is prepared with water. The solidification involves the stiffening of the binder (transition from a fluid to a firm state) and the subsequent hardening process (further increase in mechanical strength of the matrix containing the binder).

The term "setting accelerator" in the present document stands for a substance which, when added to a binder, shortens the time until the start of the setting or the start of the stiffening of the binder, when compared to a corresponding binder without setting accelerator added to it.

The term "binder" stands, for example, for an inorganic binder, which in the presence of water reacts in a hydration reaction to form solid hydrates or hydrate phases.

By a "binder based on calcium sulfate" is meant, for example, a binder comprising calcium sulfate hemihydrate and/or anhydrite. Calcium sulfate hemihydrate or $CaSO_4 \cdot 0.5 H_2O$ can be present as α-hemihydrate or β-hemihydrate. Likewise, anhydrite can be present as anhydrite II or anhydrite III. Calcium sulfate hemihydrate and/or anhydrite, for example, of all the components contained in the binder, have the largest weight fraction. For example, the binder based on calcium sulfate includes at least 25 wt. %, for example, at least 50 wt. %, for example, at least 75 wt. %, for example, at least 90 wt. %, of calcium sulfate hemihydrate and/or anhydrite. For example, the binder based on calcium sulfate except for unavoidable impurities consists exclusively of calcium sulfate hemihydrate and/or anhydrite. For example, the binder based on calcium sulfate is a mixture of β-hemihydrate with slight fractions of anhydrite III. Such binders are also known by the term "stucco".

By "gypsum" is meant in the present document calcium sulfate dihydrate or $CaSO_4 \cdot 2 H_2O$.

By a "polycarboxylate" is meant in this document a polymer comprising or consisting of at least two monomer units, each of them having at least one carboxyl group. The carboxyl group can be present as pure carboxyl group or as carboxylate. Furthermore, each carboxyl group and/or each carboxylate independently of the others can be esterified with an alcohol and/or thiol and/or be present as an acid amide. For example, the polycarboxylate comprises or consists of at least 3, for example, at least 5, for example, 20-70 monomer units. Basically, mixtures of several different polycarboxylates can also be used.

By the term "grinding" or "grinding process" is meant, for example, a process in which a mean grain size of a solid or a mixture of different solids is reduced. For example, the solid or the mixture of different solids, for example, a binder, is ground during the grinding to a Blaine value of at least 500 $cm^2/g$, for example, at least 1000 $cm^2/g$, for example, at least 2000 $cm^2/g$, for example, at least 4000 $cm^2/g$. The solid being ground is also called the "grinding product".

By "dry grinding" is meant a grinding process in which no liquid additives are added to the grinding product or the gypsum before or during the grinding, for example, no water-containing additives. In other words, only solids are added to the grinding product before or during the grinding process, such as solids in powder form. Accordingly, the dry grinding process is a grinding process that occurs, for example, essentially in the absence of liquid substances or liquid additives. The states of aggregation "liquid" and "solid" refer, for example, to standard conditions, especially a temperature of 0° C. and a pressure of 1.01325 bar. For example, substances or materials are used during the dry grinding which are in a solid state of aggregation at a temperature of 25° C., for example, 40° C., for example, 45° C., and a pressure of 1.01325 bar.

A liquid fraction, for example, a water fraction, of the substances used during the dry grinding is, for example, less than 1 wt. %, for example, less than 0.05 wt. %, for example, less than 0.001 wt. %, with respect to the quantity of the individual substance used. The liquid fraction refers here to free liquids. The water of crystallization present in the gypsum, for example, is not counted as liquid.

According to an exemplary embodiment, the gypsum is ground down to a specific surface (per Blaine) of at least 2500 $g/cm^2$, for example, at least 5000 $g/cm^2$, for example, at least 6000 $g/cm^2$ or 7000 $g/cm^2$.

In addition to the specific surface, the particle size at 50 mass % pass-through, the so-called median value $d^{50}$, can be used to judge the grinding product. The $d^{50}$ values can be determined, e.g., by means of light scattering on the particles of a powder sample. Corresponding measurement methods are familiar to the skilled person and described more closely in standard ISO 13320:2009, for example.

For example, the gypsum is ground highly fine during the dry grinding, for example, so that a $d^{50}$ value is in the range of less than (≤) 100 μm, for example, less than (≤) 70 μm, for example, less than (≤) 40 μm.

The polycarboxylate can be used in an amount of a fraction of 0.05-10 wt. %, for example, 0.05-2 wt. %, for example, 0.2-1 wt. %, with respect to the gypsum. On the one hand, the effects of the disclosure can be optimal in this way. On the other hand, such quantities can be economically advantageous.

The polycarboxylate is, for example, a polycarboxylate in the solid state of aggregation. This can be present, e.g., in the form of sheets, disks, flocks, scales, pellets, granulate and/or powder. For example, the polycarboxylate is powderlike. This can accomplish an effective blending with the grinding product or the gypsum during the dry grinding. A liquid fraction, for example, a water fraction, in the polycarboxylate can be ≤5 wt. %, for example, ≤1 wt. %, for example, ≤0.1 wt. %.

For example, the polycarboxylate is a comb polymer, which has a polycarboxylate backbone and polyether side chains. The polyether side chains are bound, for example, by ester, thioester, ether and/or amide groups to the polycarboxylate backbone.

Exemplary are polycarboxylates or comb polymers which comprise or consist of the following structural units:

a) a molar parts of a structural unit S1 of formula (I)

b) b molar parts of a structural unit S2 of formula (II)

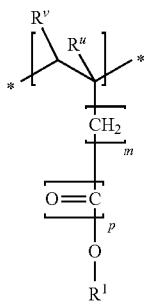

(II)

c) c molar parts of a structural unit S3 of formula (III)

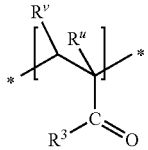

(III)

d) d molar parts of a structural unit S4 of formula (IV)

(IV)

where

M independently of each other represents $H^+$, an alkaline metal ion, alkaline earth metal ion, a divalent or trivalent metal ion, an ammonium ion or an organic ammonium group, each $R^U$ independently of the others stands for hydrogen or a methyl group, each $R^V$ independently of the others stands for hydrogen or COOM, m=0, 1 or 2, p=0 or 1, $R^1$ and $R^2$ independently of each other stand for a $C_1$ to $C_{20}$ alkyl group, cycloalkyl group, alkylaryl group or $[AO]_n-R^4$, where A=$C_2$ to $C_4$ alkylene, $R^4$ stands for H, a $C_1$ to $C_{20}$ alkyl group, cyclohexyl group or alkylaryl group, and n=2-250, $R^3$ independently of each other stand for $NH_2$, $-NR^5R^6$, $-OR^7NR^8R^9$, where $R^5$ and $R^6$ independently of each other stand for
  a $C_1$ to $C_{20}$ alkyl group, cycloalkyl group, alkylaryl group or aryl group,
  or for a hydroxyalkyl group or for an acetoxyethyl ($CH_3-CO-O-CH_2-CH_2-$) or a hydroxy-isopropyl ($HO-CH(CH_3)-CH_2-$) or an acetoxyisopropyl group ($CH_3-CO-O-CH(CH_3)-CH_2-$);
  or $R^5$ and $R^6$ together form a ring of which nitrogen is a part, in order to make up a morpholine or imidazoline ring;

$R^7$ is a $C_2$-$C_4$ alkylene group, $R^8$ and $R^9$ independently of each other represent a $C_1$ to $C_{20}$ alkyl group, cycloalkyl group, alkylary group, aryl group or a hydroxyalkyl group, and where a, b, c and d represent molar fractions of the respective structural units S1, S2, S3 and S4, with a/b/c/d=(0.1-0.9)/(0.1-0.9)/(0-0.8)/(0-0.8), for example, a/b/c/d=(0.3-0.9)/(0.1-0.7)/(0-0.6)/(0-0.4), for example, a/b/c/d=(0.5-0.9)/(0.1-0.3)/(0.001-0.005)/0 provided that a+b+c+d=1.

For example, the structural units S1, S2, S3, and S4 together have a weight fraction of at least 50 wt. %, for example, at least 90 wt. %, for example, at least 95 wt. %, of the total weight of the comb polymer. For example, the total number of the atoms present in the structural units S1, S2, S3 and S4 taken together is at least 50%, for example, at least 90%, for example, at least 95%, of all atoms present in the comb polymer.

For example, A stands for $C_2$ alkylene and/or $C_3$ alkylene, for example, $C_2$ alkylene.

For example, n=20-70.

For example, $R^1$ and/or $R^2$ independently of each other stand for $[AO]_n-R^4$, where A, $R^4$ and n are defined as above.

Exemplary is a polycarboxylate or comb polymer where $R^1$ stands for $[AO]_n-R^4$ and n=20-70. For example, $R^4$ here stands for a methyl group.

If the polycarboxylate is a comb polymer, $R^1$ and/or $R^2$ independently of each other, for example, stand for $[AO]_n-R^4$. Exemplary polycarboxylates or comb polymers have one or more of the following features:

a) the residues $R^u$ and $R^v$ stand for hydrogen and/or b) m=0
   and/or c) p=1
   and/or d) $R^1$ and $R^2$ each independently of the other stand for $-[AO]_n-R^4$ with n=20-70
   and/or e) $R^4$ represents a methyl group.

According to an exemplary embodiment, all features a) to e) are realized in the polycarboxylate.

A mean molecular weight ($M_w$) of the polycarboxylate or comb polymer is, for example, 5000-150,000 g/mol, for example, 10,000-100,000 g/mol.

A melting point or a lower limit of the melting range of the polycarboxylate can be at least 25° C., for example, 40° C., for example, 45° C.

The production of the above-mentioned polycarboxylates or comb polymers can be done, for example, by radical polymerization of the corresponding monomers of formula ($I_m$), ($II_m$), ($III_m$) and ($IV_m$), resulting in a comb polymer with the structural units S1, S2, S3 and S4. The residues $R^u$, $R^v$, $R^1$, $R^2$, $R^3$, M, m and p are defined as described above.

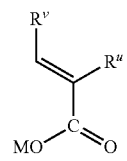

($I_m$)

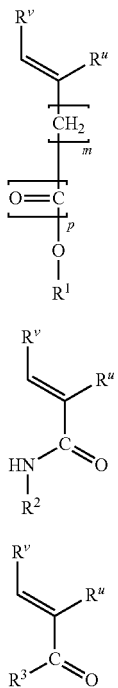

It is likewise possible to produce the comb polymers KP by a polymer-analogous transformation of a polycarboxylic acid of formula (V).

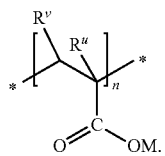

In the polymer-analogous transformation, the polycarboxylic acid of formula (V) is esterified or amidated with the corresponding alcohols or amines (e.g., HO—$R^1$, $H_2N$—$R^2$, H—$R^3$) and then neutralized or partly neutralized (depending on the nature of the residue M, e.g., with metal hydroxides or ammonia). Details on the polymer-analogous transformation are disclosed, for example, in EP 1 138 697 B1 on page 7 lines 20 to page 8 line 50, and in its examples, or in EP 1 061 089 B1 on page 4, line 54 to page 5 line 38 and in its examples. In a modification of this, as specified in EP 1 348 729 A1 on page 3 to page 5 and in its examples (e.g., paragraphs 0032 and 0037), the comb polymer can be produced in the solid state of aggregation. The disclosure of these cited patents is hereby incorporated for example by reference.

Such comb polymers are also commercially distributed by Sika Schweiz AG under the ViscoCrete® brand series.

According to an exemplary embodiment, at least one additional grinding additive can be used. For example, the additional grinding adjuvant comprises sugar, starch, quartz sand and/or dolomite. In this way, it is possible to improve the action of the polycarboxylate under some circumstances or the fraction of the polycarboxylate can be reduced. The latter can be beneficial for economic reasons.

For example, the dry grinding occurs in a grinding media mill, for example, a ball mill. In grinding media mills, one or more grinding medium and the grinding product are loosely arranged in a container and moved relative to each other. This can be accomplished, e.g., by vibration of the container. This results in collisions between the grinding media and the grinding product, so that the latter is mechanically fragmented. The fragmentation of the grinding product occurs, for example, by impact and shock stress. Besides the fragmentation of the grinding product, material changes and disruptions in the crystal lattices of the particles of grinding product also result. For example, new surface formations, amorphization, phase transformations, and dislocations may occur. This can be desirable in the present case, since such modified gypsum particles can be generally more effective as a setting accelerator.

In another aspect, the present disclosure relates to a setting accelerator, for example, for binders based on calcium sulfate, which can be obtained by a method as specified above. The setting accelerator in other words can be obtained in that gypsum together with at least one polycarboxylate is subjected to a dry grinding. In exemplary embodiments, the optional features mentioned above in connection with the method are implemented.

As has been shown in experiments, such setting accelerators produced by a dry grinding are distinguished in their structure and properties from corresponding setting accelerators made by wet grinding. Without wishing to be bound by any particular theory, this is probably due to the fact that very fine particles in the nanometer range can be dissolved by the liquid present during wet grinding and are present in smaller amounts, or not at all, in the setting accelerator. This is not the case in the production of the setting accelerator by means of dry grinding, in which this problem does not occur because no liquid is present. Yet precisely the very small particles in the nanometer range can be extremely effective crystallization seeds in binders based on calcium sulfate. If these crystallization seeds are lacking, or reduced in concentration, the result can be a lesser setting acceleration.

The setting accelerator can be used in pure form or together with at least one other additive. For example, it is possible to mix the setting accelerator together with the at least one other additive and use it as an additive composition. For this, the at least one other additive can be mixed in, for example, after the making of the setting accelerator or after the dry grinding process.

The additive used can be, e.g., a flow agent, for example, a polycarboxylate, for example, a polycarboxylate ether. The polycarboxylate can be as defined above and it can improve the flow properties of binders based on calcium sulfate. The polycarboxylate used as the additive can be different from or the same as the polycarboxylate used in the dry grinding process.

In another exemplary aspect, the present disclosure relates to the use of a setting accelerator as specified above to accelerate the setting of a binder based on calcium sulfate.

The use can be advantageous in the production of plasterboard. Due to the strong setting accelerating action, the production speed can be significantly increased in the industrial manufacturing of plasterboard.

The disclosure relates to a binder composition containing a binder based on calcium sulfate, for example, stucco, as well as a setting accelerator as specified above.

The setting accelerator is present, for example, in a fraction of 0.0005-5 wt. %, for example, 0.01-1 wt. %, in terms of the binder.

For example, the binder composition contains water in addition, while a weight ratio of water to binder lies, for example, in the range of 0.2-1, for example, 0.4-0.8, for example, 0.5-0.7. Such binder compositions can be used, e.g., for the production of plasterboard.

In another aspect, the disclosure relates to a shaped body containing a hardened binder composition as specified above. Such shaped bodies can be obtained by hardening of a binder composition as specified above after adding water. The shaped body can have practically any desired shape and is present, for example, in the form of plasterboard.

EXAMPLES

1. Production of Polycarboxylates
1.1 Comb Polymer KP1

In a reaction vessel of 1500 ml, outfitted with a mechanical agitator, temperature monitoring, mushroom heater and vacuum pump, there is placed 290 g (around 2 mol COOH) of an aqueous polyacrylic acid with mean molecular weight of 4000-6000. To this is added 600 g of methylpolyethylene glycol (MPEG 3000 of the Ineos company), as well as 100 g of methylpolyethylene glycol (MPEG 1000 of the Ineos company). Moreover, 0.3 g of defoamer and 0.3 g of Rhenofit DDA are added while stirring. The reaction mixture is heated to 175° C., whereupon the water is distilled off. After 30 minutes of stirring at this temperature, there is carefully added to the reaction mixture a mixture consisting of 5 g of Jeffamin M2070 and 4 g of 50% sodium hydroxide. As soon as the reaction mixture has again reached 175° C., the reaction is carried out under a partial vacuum of 80 mbar to the desired conversion rate, which takes around 2 hours. The MPEG and polymer content is then measured in familiar manner by means of UPLC (Ultra Performance Liquid Chromatography). It was possible to measure a polymer fraction of around 95% and a residual MPEG fraction of around 5%. The melt is then poured out from the reactor onto a metal sheet, where the bright mass solidified. The solidified mass is then ground up to a white powder. The powderlike comb polymer so obtained is designated as KP1. Melting range: 50-55° C. a/b/c/d=0.856/0.142/0.002/0. Molecular weight ($M_w$)=29,000 g/mol.

The pure comb polymer KP1 is also designated hereafter as additive A1.

1.2 Comb Polymer KP2

Another comb polymer KP2 is produced essentially the same as comb polymer KP1. However, the polymer melt is not worked into a powder but instead mixed with water (polymer fraction 40 wt. %).

The aqueous solution so produced is designated hereafter as additive A3.

2. Grinding Media Used

The following grinding media or additives A1-A4 were used for the sample embodiments (Table 1):

TABLE 1

| Designation | Composition |
| --- | --- |
| A1 | comb polymer KP1 (pure, powderlike) |
| A2 | sand (grain size: 0.06-0.3 mm) |
| A3 | comb polymer KP2 (40 wt. % in $H_2O$) |
| A4 | diethanol amine (DEA) |

2. Production of Setting Accelerators

In order to produce gypsum based setting accelerators according to the invention, additive A1 was used as grinding adjuvant during the grinding of gypsum. In this case, 200 g of gypsum (REA gypsum from Knauf) was ground with additive A1 under identical conditions each time on laboratory ball mills. The grinding duration and the mill speed were kept constant in all grinding experiments. The dosages of additive A1 are indicated in table and each time pertain to the quantity of pure additive in terms of the quantity of gypsum used. The setting accelerators obtained in this way are designated as B1-B7. Furthermore, setting accelerator B0 was produced as a reference from pure gypsum that was ground without an additive.

After the grinding process, the fineness per Blaine and the sifting residue of particles above 32 μm (in wt. % with regard to all particles) were determined per standard EN 196-6 (May 2010) with a 32 μm screen.

The parameter $d^{50}$ and the particle size distributions were furthermore determined in familiar fashion by laser granulometry.

The grinding product yield was determined by weighing. Given the original amount weighed out, the amount of gypsum caked on or sticking to the balls of the laboratory ball mill was determined from this.

Table 2 gives a summary of the grinding experiments performed and the corresponding results.

TABLE 2

| | Accelerator | | | | | | |
| --- | --- | --- | --- | --- | --- | --- | --- |
| | B0 | B1 | B2 | B3 | B4 | B5 | B6 |
| Additive | — | A1 | A1 | A1 | A1 | A1 | A1 |
| Dosage [wt. %] | — | 0.050 | 0.250 | 0.500 | 1.000 | 2.500 | 5.000 |
| Grinding product yield [g] | 162 | 165 | 172 | 175 | 190 | 200 | 189 |
| Adhesion [g] | 38 | 35 | 28 | 25 | 10 | 0 | 11 |
| Fineness [$cm^2$/g] | 7030 | 7210 | 6790 | 6570 | 5620 | 2270 | 3190 |
| Sifting residue > 32 μm [wt. %] | 51.6 | 51.0 | 53.5 | 53.4 | 59.3 | 81.3 | 76.4 |
| $d^{50}$ [μm] | 33.8 | 33.1 | 36.0 | 35.8 | 42.1 | 61.6 | 57.5 |

For comparison purposes, setting accelerators based on gypsum were also prepared in similar fashion with use of additives A2-A4.

Table 3 gives a corresponding summary of the setting accelerators BV1-BV4 so produced. The method for the production of the accelerator BV3 corresponds to a wet grinding, since the grinding adjuvant is used in the form of an aqueous solution (additive A3).

TABLE 3

| | Experiment | | | | |
| --- | --- | --- | --- | --- | --- |
| | B0 | BV1 | BV2 | BV3 | BV4 |
| Additive | — | A2 | A2 | A3 | A4 |
| Dosage [wt. %] | — | 0.500 | 5.000 | 0.250* | 0.500 |

TABLE 3-continued

| | \multicolumn{5}{c}{Experiment} | | | | |
|---|---|---|---|---|---|
| | B0 | BV1 | BV2 | BV3 | BV4 |
| Grinding product yield [g] | 162 | 167 | 180 | 104 | 185 |
| Adhesion [g] | 38 | 33 | 20 | 96 | 15 |
| Fineness [cm²/g] | 7030 | 6880 | 6350 | 5750 | 6180 |
| Sifting residue >32 μm [wt. %] | 51.6 | 52.6 | 54.7 | 57.6 | 54.9 |
| d⁵⁰ [μm] | 33.8 | 34.9 | 37.1 | 39.9 | 37.2 |

[1] In terms of the content of comb polymer in additive A3

It is evident from Table 2 that with increasing quantity of additive A1 or comb polymer KP1 there is less adhesion in the mill. This basically holds also for the comparison experiments BV1 and BV2 with sand (additive A2) (see Table 3). However, the adhesion when using additive A2 (sand) for a corresponding dosage is definitely higher than with additive A1. Furthermore, there is increased wear on the grinding media when grinding harder materials such as sand.

In view of the overall grinding process, dosages of additive A1 in the range of 0.050-5 wt. % (accelerators B1-B4) and for example dosages of additive A1 in the range of 0.250-1 wt. % (accelerators B1-B3) are advantageous.

If instead of the powderlike comb polymer KP1 (additive A1, accelerator B2) one adds the same comb polymer in the same concentration, yet dissolved in water (additive A3, accelerator BV3), the adhesion increases significantly (Table 3). This clearly shows the differences between dry and wet grinding.

3. Gypsum Experiments

The effectiveness of the setting accelerators B0-B6 and BV1-BV4 in stucco was likewise investigated. For this, each time 200 g of stucco (Knauf) was prepared with 140 g of water and 0.4 g of the respective setting accelerator. The ratio of water to binder was constant at 0.7.

Immediately after the preparation, the flow spread was determined by means of a hollow cylinder (diameter 50 mm, height 50 mm) on a glass plate. The start of stiffening and the end of stiffening were then ascertained by means of conventional test methods (knife cutting and thumb pressure method).

Table 4 gives a summary of experiments G0-G6 with the accelerators B0-B6. Experiment R was conducted without accelerator and serves as a reference.

TABLE 4

| | \multicolumn{8}{c}{Experiment} | | | | | | | |
|---|---|---|---|---|---|---|---|---|
| | R | G0 | G1 | G2 | G3 | G4 | G5 | G6 |
| Accelerator | — | B0 | B1 | B2 | B3 | B4 | B5 | B6 |
| Flow spread | 180 | 167 | 154 | 157 | 158 | 164 | 187 | 188 |
| Start of stiffening [min:s] | 9:20 | 3:10 | 2:55 | 2:45 | 2:45 | 2:50 | 3:40 | 3:55 |
| End of stiffening [min:s] | 24:00 | 9:20 | 8:15 | 7:55 | 7:50 | 7:30 | 9:20 | 9:55 |

Table 5 gives a corresponding summary of the experiments GV1-GV4 conducted with the accelerators BV1-BV4.

TABLE 5

| | \multicolumn{5}{c}{Experiment} | | | | |
|---|---|---|---|---|---|
| | R | G0 | GV1 | GV2 | GV3 | GV4 |
| Accelerator | — | B0 | BV1 | BV2 | BV3 | BV4 |
| Flow spread | 180 | 167 | 165 | 159 | 170 | 172 |
| Start of stiffening [min:s] | 9:20 | 3:10 | 3:15 | 3:15 | 4:00 | 3:40 |
| End of stiffening [min:s] | 24:00 | 9:20 | 9:15 | 9:15 | 10:55 | 9:30 |

As can be seen from Table 4, all the accelerators B0-B6 show a setting accelerating action as compared to the reference R without accelerator. Advantageous are the accelerators B1-B4 (experiments G1-G4), which were made with additive A1 in dosages in the range of 0.050-1.000 wt. %. These accelerators show a clearly better accelerator action as compared to the reference B0 (gypsum ground without additive).

On the contrary, a worse setting acceleration is observed in the comparison experiment GV3 with the wet-ground setting accelerator BV3. This also holds essentially for the experiments GV1, GV2 and GV4 with accelerators BV1, BV2 and BV4.

It will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

What is claimed is:

1. A method for making a setting accelerator suitable for binders based on calcium sulfate, the method comprising subjecting materials consisting of gypsum together with at least one polycarboxylate to a dry grinding,
wherein the polycarboxylate is used in a fraction of 0.05 to 2 wt. % with respect to the gypsum,
wherein the polycarboxylate comprises:
a) a molar parts of a structural unit S1 of formula (I):

b) b molar parts of a structural unit S2 of formula (II):

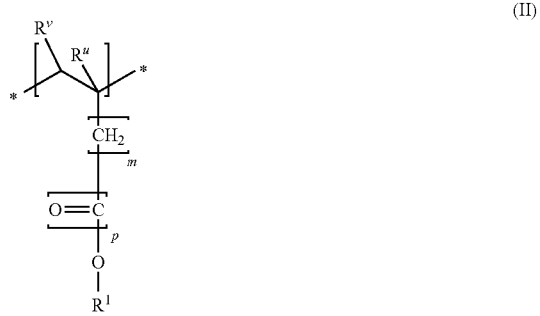

c) c molar parts of a structural unit S3 of formula (III):

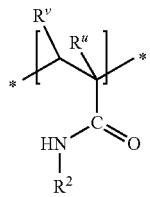

(III)

d) d molar parts of a structural unit S4 of formula (IV):

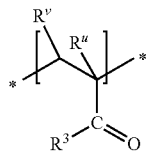

(IV)

where

M independently of each other represents $H^+$, an alkaline metal ion, alkaline earth metal ion, a divalent or trivalent metal ion, an ammonium ion or an organic ammonium group, each $R^u$ independently of the others stands for hydrogen or a methyl group, each $R^v$ independently of the others stands for hydrogen or COOM, m=0, 1 or 2, p=0 or 1, $R^1$ and $R^2$ independently of each other stand for a $C_1$ to $C_{20}$ alkyl group, cyclo-alkyl alkylaryl group $[AO]_n$—$R^4$, where A=$C_2$ to $C_4$ alkylene, R4 stands for H, a $C_1$ to $C_{20}$ alkyl group, cyclohexyl group or alkylaryl group, and n=2–250, $R^3$ independently of each other stand for $NH_2$, —$NR^5R^6$, —$OR^7NR^8R^9$, where $R^5$ and $R^6$ independently of each other stand for a $C_1$ to $C_{20}$ alkyl group, cycloalkyl group, alkylaryl group or aryl group, or for a hydroxyalkyl group or for an acetoxyethyl ($CH_3$—CO—O—$CH_2$—$CH_2$—) or for a hydroxy-isopropyl (HO—CH($CH_3$)—$CH_2$—) or for an acetoxyisopropyl group ($CH_3$—CO—O—CH($CH_3$)—$CH_2$—);

or $R^5$ and $R^6$ together form a ring of which nitrogen is a part, in order to make up a morpholine or imidazoline ring;

$R^7$ is a $C_2$-$C_4$ alkylene group, $R^8$ and $R^9$ independently of each other represent a $C_1$ to $C_{20}$ alkyl group, cycloalkyl group, alkylary group, aryl group or a hydroxyalkyl group, and where a, b, c and d represent molar fractions of the respective structural units S1, S2, S3 and S4, wherein a=0.1–0.9,
b=0.1–0.9,
c=0–0.8,
d=0–0.8,
and provided that a+b+c+d=1.

2. The method according to claim 1, wherein the gypsum is ground to a $d^{50}$ value of the particle size in the range of less than 100 μm.

3. The method according to claim 1, wherein the polycarboxylate is in a solid state of aggregation.

4. The method according to claim 1, wherein the polycarboxylate is a comb polymer which has a polycarboxylate backbone and polyether side chains, wherein the polyether side chains are bound by ester, ether and/or amide groups to the polycarboxylate backbone.

5. The method according to claim 1, wherein the polycarboxylate satisfies at least one of the following conditions a) to e):

a) the residues Ru and Rv stand for hydrogen,
b) m=0,
c) p=1,
d) $R^1$ and $R^2$, each independently of the other, stand for -$[AO]_n$—$R^4$ with n=20-70,
e) $R^4$ represents a methyl group.

6. The method according to claim 1, wherein the dry grinding occurs in grinding media mill.

7. The method according to claim 2, wherein the gypsum is ground to a $d^{50}$ value of the particle size in the range of less than 70 μm.

8. The method according to claim 7, wherein the gypsum is ground to a $d^{50}$ value of the particle size in the range of less than 40 μm.

9. The method according to claim 1, wherein the polycarboxylate is used in a fraction of 0.2-1 wt. %.

10. The method according to claim 1, wherein the polycarboxylate is in the form of a powder.

11. The method according to claim 1, wherein
a=0.3–0.9,
b=0.1–0.7,
c=0–0.6,
d=0–0.4,
and provided that a+b+c+d=1.

12. The method according to claim 1, wherein
a=0.5–0.9,
b=0.1–0.3,
c=0.001–0.005,
d=0,
and provided that a+b+c+d=1.

13. The method according to claim 6, wherein the grinding media mill is a ball mill.

14. The method according to claim 1, further comprising adding the setting accelerator to a binder based on calcium sulfate, wherein the binder based on calcium sulfate includes at least 90 wt. % of calcium sulfate hemihydrate and/or anhydrite.

* * * * *